United States Patent [19]

Jiang

[11] Patent Number: 5,793,626

[45] Date of Patent: Aug. 11, 1998

[54] HIGH EFFICIENCY BIMODAL POWER CONVERTER AND METHOD OF OPERATION THEREOF

[75] Inventor: Yimin Jiang, Plano, Tex.

[73] Assignee: Lucent Technologies Inc., Murray Hill, N.J.

[21] Appl. No.: 954,005

[22] Filed: Oct. 20, 1997

Related U.S. Application Data

[63] Continuation of Ser. No. 657,462, May 29, 1996, abandoned.

[51] Int. Cl.$^6$ .................. H02M 7/06; H02M 7/04; G05F 1/10; G05F 1/40
[52] U.S. Cl. ............... 363/126; 363/143; 323/222; 323/284
[58] Field of Search ............ 363/89, 126, 143, 363/125, 84; 323/222, 282, 284, 266, 299

[56] References Cited

U.S. PATENT DOCUMENTS

| | | | |
|---|---|---|---|
| 4,665,323 | 5/1987 | Russell et al. | 363/143 |
| 4,837,672 | 6/1989 | Doze | 363/143 |
| 4,937,731 | 6/1990 | Konopka | 363/143 |
| 5,119,283 | 6/1992 | Steigerwald et al. | 363/143 |
| 5,126,984 | 6/1992 | Castagnet et al. | 363/143 |
| 5,146,398 | 9/1992 | Vila-Masto et al. | 363/89 |
| 5,235,504 | 8/1993 | Sood | 363/53 |
| 5,287,263 | 2/1994 | Shilo | 363/143 |
| 5,313,382 | 5/1994 | Farrington | 363/16 |
| 5,321,600 | 6/1994 | Fierheller | 363/65 |
| 5,349,284 | 9/1994 | Whittle | 323/207 |
| 5,367,247 | 11/1994 | Blocher et al. | 323/222 |
| 5,391,976 | 2/1995 | Farrington et al. | 323/207 |
| 5,408,403 | 4/1995 | Nerone et al. | 363/37 |
| 5,420,780 | 5/1995 | Bernstein et al. | 363/89 |
| 5,432,431 | 7/1995 | Vinciarelli et al. | 323/222 |
| 5,446,366 | 8/1995 | Bassett et al. | 323/222 |
| 5,572,415 | 11/1996 | Mohan | 363/143 |

*Primary Examiner*—Edward Tso
*Assistant Examiner*—Bao Q. Vu

[57] ABSTRACT

A bimodal power converter, having an input couplable to a voltage source, provides a charging current to at least one of first and second serially-coupled output energy storage devices. The bimodal converter includes power switching circuitry, coupled to the input, for controlling the charging current conducted through the power converter and a mode selection circuit. The mode selection circuit includes a voltage sensing circuit for sensing an input voltage at the input of the power converter and a mode switching circuit, coupled to the voltage sensing circuit, for selecting an alternative one of a first and second mode of operation. In the first mode of operation, the charging current concurrently flows through both of the first and second output energy storage devices when the input voltage exceeds a threshold voltage. In the second mode of operation, the charging current alternates flowing through the first and second output energy storage devices when the input voltage is less than the threshold voltage. The mode selection circuit thereby decreases losses associated with components of the power converter. Concurrently, a duty cycle of the power switching circuitry reduces to decrease conduction losses associated with the power converter.

22 Claims, 4 Drawing Sheets

HIGH EFFICIENCY BIMODAL POWER CONVERTER AND METHOD OF OPERATION THEREOF

This application is a file wrapper continuation of application Ser. No. 08/657,462, filed on May 29, 1996, now abandoned.

TECHNICAL FIELD OF THE INVENTION

The present invention is directed, in general, to power supplies and, more specifically, to a high efficiency power converter and a method of operation thereof.

BACKGROUND OF THE INVENTION

Developing highly-efficient power supplies, especially in combination with the ever-increasing constraints of high power density, is a continuing goal in power electronics. A switched-mode power converter is a frequently employed power supply that converts an input voltage waveform into a specified output voltage waveform. A boost power converter converts the input voltage source to an output voltage that is greater than the input voltage source. Typically, the boost power converter is employed in off-line applications wherein power factor correction is required and a stable regulated voltage is desired at the output of the power converter.

A non-isolated boost power converter includes an inductor coupled to the input voltage and a switching device. The switching device is then coupled to a diode and a capacitor. The load is connected in parallel to the capacitor. The output voltage (measured at the load) is always greater than the input voltage. When the switching device is on, the diode is reverse biased thereby isolating the output stage. The input voltage supplies energy to the inductor. When the switching device is off, the output stage receives energy from the inductor and the input voltage source.

As previously mentioned, the boost power converter generally provides very good power factor correction. The power factor is defined as a ratio of the actual power delivered to the load to the product of the voltage and current at the input of the boost power converter. Additionally, the boost power converter generally attains a high efficiency in transforming the input voltage to a desired output voltage. The efficiency, however, varies as a function of a ratio of the input voltage to the output voltage of the power converter. In general, as the input voltage decreases for a given output voltage delivered to the load, the efficiency of the boost power converter begins to decline.

The efficiency of the boost power converter declines as the input voltage decreases because of the additional losses in the power converter. First, as the input voltage level decreases, the input current increases for a given power level and the conversion efficiency of the circuit is sensitive to the current level. Simply stated, the conduction losses and switching losses inherent in the components of the power converter are higher with an increase in the current therein. Furthermore, the switching devices of the power converter suffer from a higher duty cycle at low input voltage thereby causing additional conduction losses associated with the switching devices.

Accordingly, what is needed in the art is a power converter, and method of operation thereof, that can attain a higher efficiency across a full range of input voltage for a given output voltage and power level delivered to the output of the power converter.

SUMMARY OF THE INVENTION

To address the above-discussed deficiencies of the prior art, the present invention provides, a power converter and method of operation thereof.

The power converter, having an input couplable to a voltage source and providing a charging current to at least one of first and second serially-coupled output energy storage devices, includes: (1) power switching circuitry, coupled to the input, for controlling the charging current conducted through the power converter and (2) a mode selection circuit, including: (A) a voltage sensing circuit for sensing an input voltage (i.e., the amplitude of the input voltage or a signal representative of the amplitude of the input voltage, for instance, the peak value of the input voltage) at the input of the power converter and (B) a mode switching circuit, coupled to the voltage sensing circuit, for selecting an alternative one of: (a) a first mode wherein the charging current concurrently flows through both of the first and second output energy storage devices when the input voltage exceeds a threshold voltage and (b) a second mode wherein the charging current alternates flowing through the first and second output energy storage devices when the input voltage is less than the threshold voltage. The mode selection circuit thereby decreases losses associated with components of the power converter.

The present invention includes power switching circuitry and a mode selection circuit to produce a bimodal power converter. For reasons that will become more apparent, the efficiency of particular power converters decrease when the input voltage level falls below a threshold level for a given output voltage. The power converter of the present invention reduces switching and conduction losses associated therewith to maintain the overall efficiency of the power converter.

In an alternative embodiment of the present invention, the first and second output energy storage devices include capacitive devices. The charging current is delivered to the capacitive devices to charge the devices to a voltage level to supply sufficient power to a connected load. One of ordinary skill in the pertinent art should understand that other energy storage devices are well within the scope of the present invention.

In an alternative embodiment of the present invention, the mode selection circuit includes a voltage comparator circuit, coupled between the voltage sensing circuit and the mode switching circuit, for comparing the input voltage to the threshold voltage. The voltage comparator circuit includes an operational amplifier to amplify the sensed input voltage for a comparison of the input voltage level to the threshold voltage. Depending on the level of the input voltage, a signal is transmitted to the mode switching circuit to select one of the alternative modes of operation thereof.

In an alternative embodiment of the present invention, the mode switching circuit includes a relay. One of ordinary skill in the pertinent art should understand that other mode switching devices are well within the scope of the present invention.

In an alternative embodiment of the present invention, the threshold voltage includes a voltage slightly less than one-half of a voltage across the first and second output energy storage devices. For the purposes of the present invention, slightly less than one-half generally refers to a number within ten percent of one-half. The threshold voltage is selected to enhance the overall efficiency of the power converter across a full range of input voltage and for a given output voltage. Of course one of ordinary skill in the pertinent art should understand that the threshold voltage may vary depending on the application. Therefore, other threshold voltage levels are well within the broad scope of the present invention.

In an alternative embodiment of the present invention, the components of the power converter include a rectifier coupled between the power switching circuitry and the first and second output energy storage devices. The rectifier in combination with the power switching circuitry receive an AC voltage and deliver a charging current to the energy storage devices. As a result of the operation thereof, the power switching circuitry and rectifier (e.g., rectifier diodes) create a portion of the conduction and switching losses inherent in the power converter. The present invention reduces the losses associated with the devices to increase the overall efficiency of the power converter.

In an alternative embodiment of the present invention, the power converter includes an inductor coupled between the input and the power switching circuitry. The inductor stores energy from the input voltage source during one portion of a switching cycle of the power switching circuitry. As will be described in greater detail, during a complimentary portion of the switching cycle of the power switching circuitry, the energy stored in the inductor is transferred to the energy storage devices.

Another aspect of the present invention is a power supply, including: (I) an input couplable to a voltage source and (II) a power factor correction converter, including: (1) power switching circuitry, coupled to the input, for controlling a charging current conducted through the power supply, (2) first and second serially coupled output energy storage devices, coupled to the power switching circuitry, for receiving the charging current and (3) a mode selection circuit, coupled between the input and the first and second output energy storage devices, including: (A) a voltage sensing circuit for sensing an input voltage at the input of the power supply and (B) a mode switching circuit, coupled to the voltage sensing circuit, for selecting an alternative one of: (a) a first mode wherein the charging current concurrently flows through both of the first and second output energy storage devices when the input voltage exceeds a threshold voltage and (b) a second mode wherein the charging current alternates flowing through the first and second output energy storage devices when the input voltage is less than the threshold voltage thereby to decrease losses associated with components of the power supply. In an alternative, but related, embodiment, the power supply also includes a DC/DC power converter coupled to the energy storage devices to achieve a desired DC voltage to a load employing the power supply to advantage.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
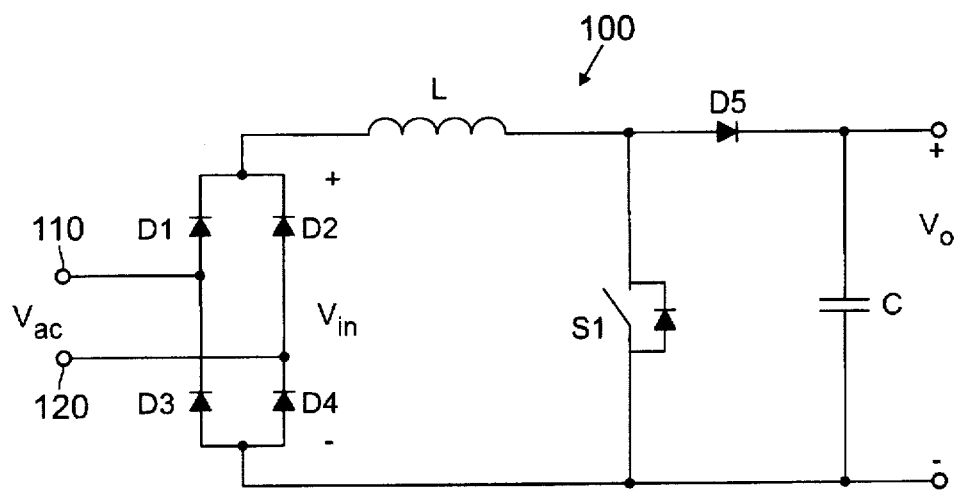
FIG. 1 illustrates a schematic diagram of a prior art power converter.

Referring initially to FIG. 1, illustrated is a schematic diagram of a prior art power converter 100. The power converter 100 includes a diode-bridge rectifier circuit (comprising a plurality of diodes D1, D2, D3, D4), series inductor L, semiconductor switch S1, diode D5 and output storage capacitor C. The semiconductor switch S1 is typically a high-frequency switching transistor that is controlled by a pulse-width modulator circuit (not shown). The power converter 100 is a conventional boost power converter and those of ordinary skill in the related art should be familiar with the operation of such a converter.

As a boost power converter, the power converter 100 provides an output voltage $V_o$ (e.g., a DC output voltage) that has a magnitude greater than the peak voltage $V_{in}$ developed across the diode-bridge rectifier circuit. The magnitude of the output voltage $V_o$ is controlled by selectively opening and closing the switch S1. When the switch S1 is closed, a substantially sinusoidal source voltage $V_{ac}$ at terminals 110, 120 causes current to flow through the diode D1, inductor L, switch S1 and diode D4 during positive half-cycles, and through the diode D2, inductor L, switch S1 and diode D3 during negative half-cycles, thereby storing energy in the inductor L. When the switch S1 is open, current flows either through the diode D1, inductor L, diode D5 and diode D4, or through the diode D2, inductor L, diode D5 and diode D3 to thereby store energy in the output capacitor C.

Those of ordinary skill in the art will recognize that the power converter 100 endures conduction losses associated with the flow of current through the switch S1 and diodes D1, D2, D3, D4, D5. The losses, associated with these components, reduce the overall operating efficiency of the power converter 100. As will hereinafter be discussed in more detail, the conduction losses for a power converter can be minimized and the efficiency thereof be improved by reducing the number of components that realize losses in the power converter.

Figure 2A:
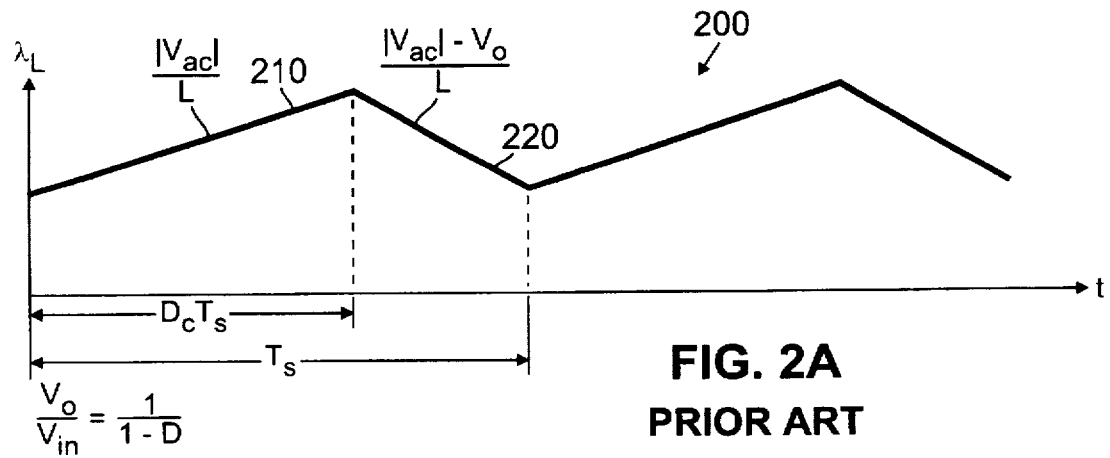
FIG. 2A illustrates a current characteristic curve of the power converter of FIG. 1.

Turning now to FIG. 2A, illustrated is a current characteristic curve 200 of the power converter 100 of FIG. 1. The curve 200 is characterized by two regions 210, 220 corresponding to the closed and open states of the switch S1. The time $T_s$ is a pulse-width modulator switching period for the switch S1; the duty cycle $D_c$ is a pulse-width modulator duty cycle for the switch S1.

Those of ordinary skill in the art will recognize that for a given input voltage $V_{in}$ and switching period $T_s$, the output voltage $V_O$ for the power converter 100 is related to the duty cycle $D_c$ by an expression:

$$V_O/V_{in}=1/(1-D_c) \quad [1]$$

Thus, as an example, for the power converter 100 to produce an output voltage $V_O$ twice as large as the input voltage $V_{in}$, the duty-cycle of the switch S1 would be about one-half ½ (M). As the input voltage $V_{in}$ varies, the pulse-width modulator circuit (not shown) controls the duty cycle $D_c$ of switch S1 to maintain a constant output voltage $V_O$.

Figure 2B:
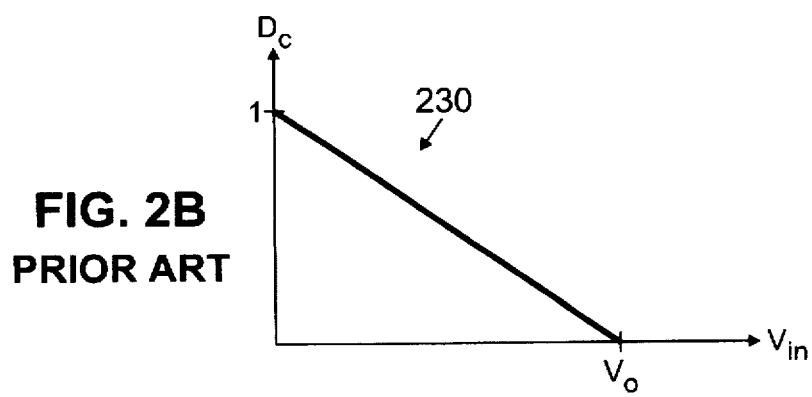
FIG. 2B illustrates a curve of a relationship of the duty cycle versus the input voltage of the power converter of FIG. 1.

Turning now to FIG. 2B, illustrated is a curve 230 of a relationship of the duty cycle $D_c$ versus the input voltage $V_{in}$ of the power converter 100 of FIG. 1. The curve 230 demonstrates the relationship between the required duty cycle $D_c$ and the input voltage $V_{in}$ necessary to maintain a constant output voltage $V_O$. When the input voltage $V_{in}$ decreases, the duty cycle $D_c$ required to maintain the output voltage $V_O$ increases. Furthermore, as those of skill in the art will recognize, when the input voltage $V_{in}$ decreases, the input current will increase, resulting in greater switching and conduction losses and thus lower efficiency.

With continuing reference to FIGS. 1, 2A, 2B, it is recognized that for a mode of operation corresponding to the current region 210 (i.e., when the switch S1 is closed), the power converter 100 endures conduction losses attributable to the switch S1 and diodes D1, D4 (e.g., when source voltage $V_{ac}$ has positive polarity); it is also recognized that for a mode of operation corresponding to the current region 210 (i.e., when the switch S1 is closed), the power converter 100 endures conduction losses attributable to the switch S1 and diodes D2, D3 (e.g., when source voltage $V_{ac}$ has negative polarity). Thus, when the switch S1 is closed (current region 210), the conduction losses of the power converter 100 are attributable to the switch and two (2) diodes (i.e., 1S+2D). Conversely, when the switch S1 is open (current region 220), the power converter 100 endures conduction losses attributable to diodes D1, D5, D4 (e.g., when source voltage $V_{ac}$ has positive polarity); when the switch S1 is open (current region 220), the power converter 100 endures conduction losses attributable to diodes D2, D5, D3 (e.g., when source voltage $V_{ac}$ has negative polarity). Thus, when switch S1 is open (current region 220) the conduction losses of the power converter 100 are attributable to three (3) diodes (i.e., 3D).

Figure 3:
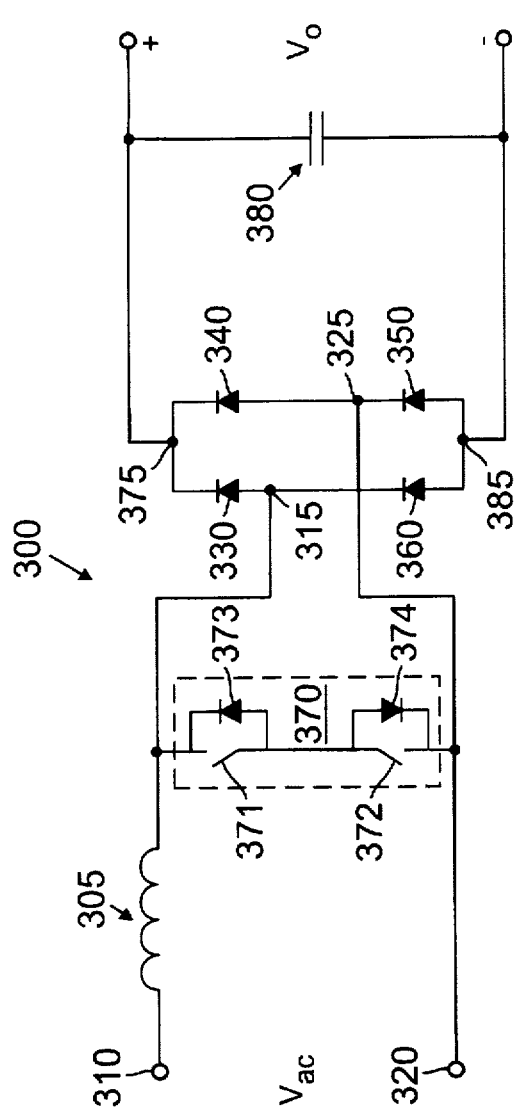
FIG. 3 illustrates a schematic diagram of another prior art power converter.

Turning now to FIG. 3 illustrated is schematic diagram of another prior art power converter 300. The power converter 300 is, generally, disclosed in U.S. Pat. No. 5,391,976 to Farrington, et al., issued on Feb. 21, 1995, entitled "Power Factor Control Arrangement for an OLS Based on Quarter Cycle Averaged Power Flow," commonly assigned with the present invention and incorporated herein by reference. The power converter 300 reduces losses of the components therein as compared with the power converter 100, thereby achieving a higher efficiency power supply. The power converter 300 has an input terminal 310 coupled to a node 315 through an inductor 305; the power converter 300 also has an input terminal 320 coupled to the node 325. A diode bridge circuit including diodes 330, 340, 350, 360 is coupled between the nodes 315, 325. A pair of nodes 375, 385 of the diode bridge circuit are coupled to a capacitor 380 having an output voltage $V_O$ thereacross. A bidirectional power switch 370 selectively connects the two nodes 315, 325. The bidirectional power switch 370 is modeled in FIG. 3 as two (2) power switches 371, 372 in parallel with two (2) back-to-back body diodes 373, 374, respectively. The bidirectional power switch 370 is controlled, according to principles known in the art, by a pulse width modulator circuit (not shown) to thereby produce a DC output voltage across the output capacitor 380. Although both of the power converters 100, 300 (as illustrated in FIGS. 1, 3, respectively) are designed to convert an AC input voltage to a DC output voltage, the power converter 300 can achieve a higher efficiency due to the reduction of the conduction losses associated with the components therein.

The power converter 300 generally operates as follows. When the bidirectional power switch 370 is closed, a substantially sinusoidal source voltage $V_{ac}$ at the terminals 310, 320 causes current to flow through the inductor 305, switch 371 and diode 374 (during positive half-cycles of the source voltage $V_{ac}$) and through the inductor 305, switch 372 and diode 373 (during negative half-cycles of the source voltage $V_{ac}$) thereby storing energy in the inductor 305. When the bidirectional power switch 370 is open, current flows through the inductor 305, diode 330, capacitor 380 and diode 350 (during positive half-cycles of the source voltage $V_{ac}$) and through the inductor 305, diode 340, capacitor 380 and diode 360 (during negative half-cycles of the source voltage $V_{ac}$) to thereby store energy in output capacitor 380. Thus, the operation of the power converter 300 is characterized by conduction losses associated with the bidirectional switch 370 (including diodes 373, 374) and diodes 330, 340, 350, 360.

Figure 4:
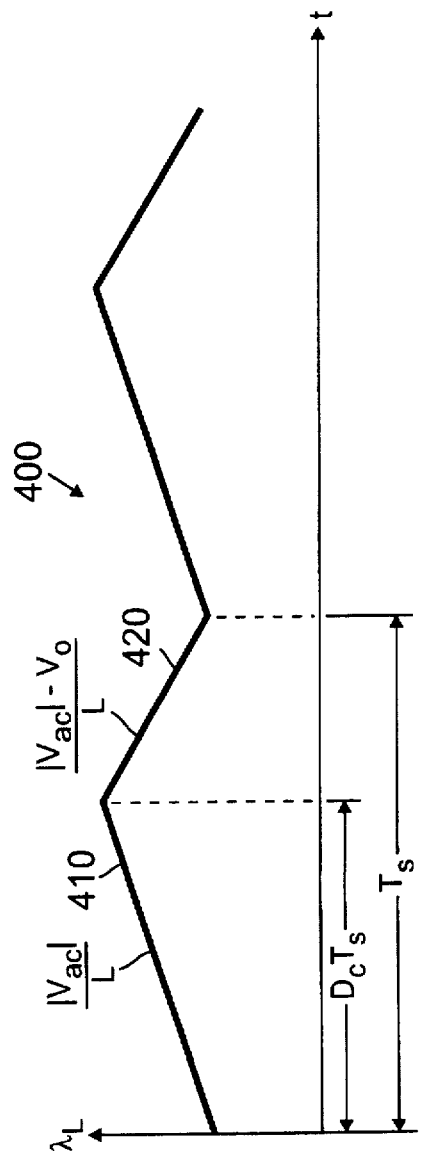
FIG. 4 illustrates a current characteristic curve of the power converter of FIG. 3.

Turning now to FIG. 4, illustrated is a current characteristic curve 400 of the power converter 300 of FIG. 3. The curve 400 includes regions 410, 420 pertaining to the operation of the power converter 300 of FIG. 3. With continuing reference to FIG. 3, the operation and conduction losses of the power converter 300 and components associated therewith is hereinafter described. For a mode of operation corresponding to the current region 410 (i.e., when the bidirectional power switch 370 is closed), the power converter 300 endures conduction losses attributable to the power switch 371 and diode 374 (when source voltage $V_{ac}$ has a positive polarity) and to the power switch 372 and diode 373 (when source voltage $V_{ac}$ has a negative polarity). Conversely, when the bidirectional power switch 370 is open (current region 420), the power converter 300 endures conduction losses attributable to the diodes 330, 350 (when source voltage $V_{ac}$ has a positive polarity) and to the diodes 340, 360 (when source voltage $V_{ac}$ has a negative polarity).

Thus, when bidirectional power switch 370 is closed, the conduction losses of the power converter 300 are attributable to one (1) switch and one (1) diode (i.e., 1S+1D). In contrast, the losses of the power converter 100 of FIG. 1 during a similar mode of operation are attributable to one (1) switch and two (2) diodes. Furthermore, when bidirectional power switch 370 is open, the conduction losses of the power converter 300 are attributable to two (2) diodes (i.e., 2D). In contrast, the losses of the power converter 100 during a similar mode of operation are attributable to three (3) diodes. Thus, the power converter 300 reduces the number of circuit components exhibiting conduction losses thereby achieving a higher overall efficiency than the power converter 100 of FIG. 1.

Figure 5:
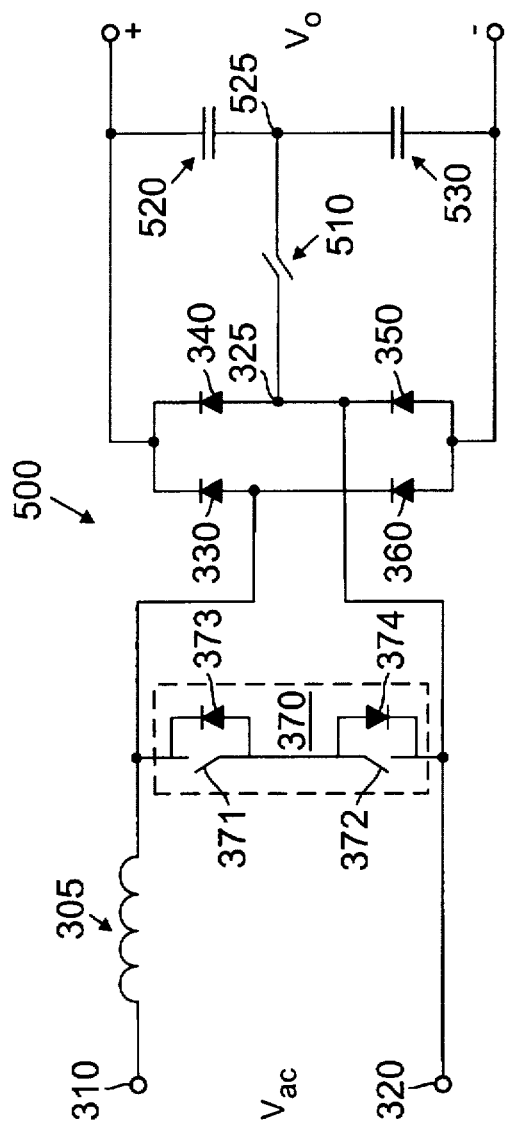
FIG. 5 illustrates a schematic diagram of one embodiment of a power converter constructed according to the principles of the present invention.

Turning now to FIG. 5, illustrated is a schematic diagram of one embodiment of a power converter 500 constructed according to the principles of the present invention. The power converter 500 includes power switching circuitry including the bidirectional switch 370 introduced with respect to FIG. 3. The power converter 500 also includes two (2) capacitors 520, 530 connected in series to a mode selection circuit including a mode switch or mode switching circuit 510 coupled to the node 325 and to a node 525 formed by the series connection of the capacitors 520, 530. The output capacitors 520, 530 are appropriately selected to have a combined series voltage rating equivalent to the voltage rating of the single capacitor 380 of the power converter 300 of FIG. 3. The mode switch 510 selectively couples and decouples the nodes 325, 525.

The mode switch 510 is, in one embodiment, a voltage sensitive relay controlled as a function of the AC input voltage $V_{ac}$ of the power converter 500 and is used to control the mode of operation of the power converter 500. The mode switch 510 can therefore improve the overall operating efficiency of the power converter 500. To this end, when the power converter 500 is operating at input voltages $V_{ac}$ (i.e., the amplitude of the input voltage or a signal representative of the amplitude of the input voltage, for instance, the peak value of the input voltage) above a threshold level, the mode switch 510 is controlled to an open state. When the mode switch 510 is open, the operation of the power converter 500 is identical to the operation of the power converter 300 of FIG. 3. When the input voltage $V_{ac}$ available to power converter 500 is below the threshold voltage, however, the mode switch 510 is preferably closed (see description with respect to FIG. 6).

Figure 6:
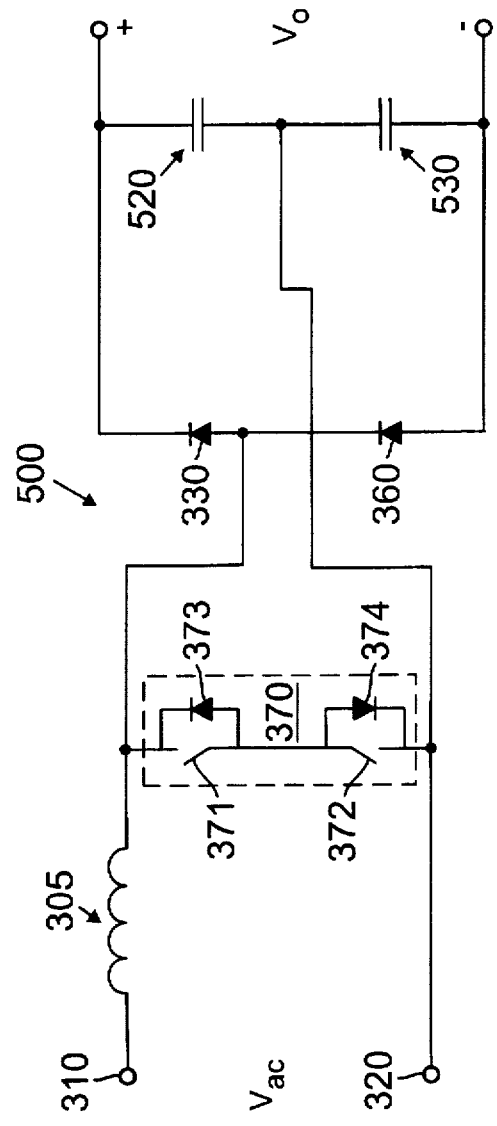
FIG. 6 illustrates a schematic diagram of the power converter of FIG. 5 representing a mode of operation thereof.

Turning now to FIG. 6, illustrated is a schematic diagram of the power converter 500 of FIG. 5 representing a mode of operation thereof. More specifically, the schematic diagram represents the operation of the power converter 500 when the mode switch 510 is closed. When the bidirectional power switch 370 is closed, a substantially sinusoidal source voltage $V_{ac}$ at terminals 310, 320 causes current to flow through the inductor 305, switch 371 and diode 374 (during positive half-cycles of the source voltage $V_{ac}$) and through the inductor 305, switch 372 and diode 373 (during negative half-cycles of the source voltage $V_{ac}$) thereby storing energy in the inductor 305. When the bidirectional power switch 370 is open, current flows through the inductor 305, diode 330 and capacitor 520 (during positive half-cycles of the source voltage $V_{ac}$) and through the capacitor 530, diode 360 and inductor 305 (during negative half-cycles of the source voltage $V_{ac}$) to thereby store energy alternately in the output capacitors 520, 530. Thus, the operation of the power converter 500 when the mode switch 510 is closed (i.e., when the source voltage $V_{ac}$ falls below the threshold voltage) is characterized by conduction losses associated with the bidirectional switch 370 (including diodes 373, 374) and diodes 330, 340, individually (see discussion with respect to FIG. 7 for more detail). Additionally, the switching losses associated with the bidirectional switch 370 (including diodes 373, 374) and diodes 330, 340 are decreased as a result of the reduction of the amplitude of the voltage (due to the alternate charging the output capacitors 520, 530 rather than one output capacitor as in the prior art) across the components in the power converter 500.

Figure 7:
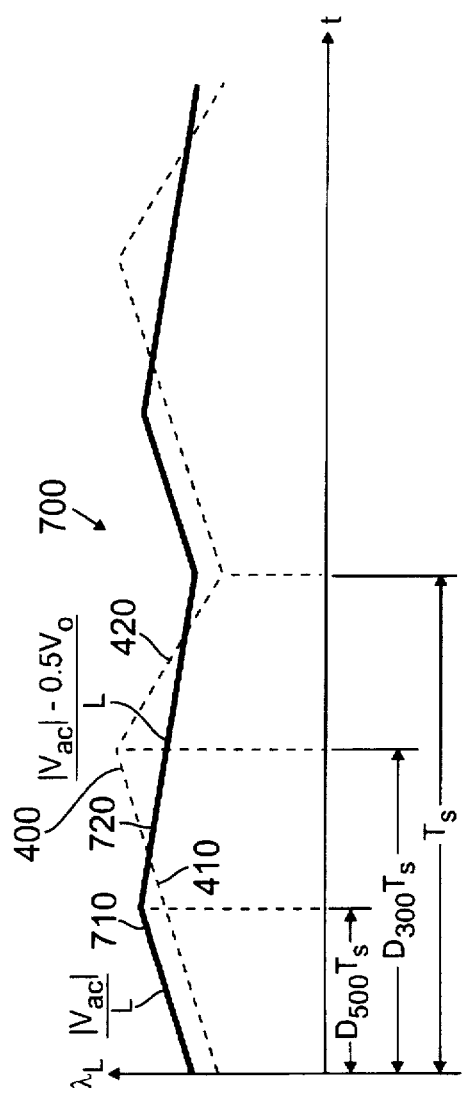
FIG. 7 illustrates a current characteristic curve of the power converter of FIGS. 5 and 6.

Turning now to FIG. 7, illustrated is a current characteristic curve 700 of the power converter 500 of FIGS. 5 and 6. More specifically, the curve 700 represents the operation of the power converter 500 when the mode switch 510 is closed (see FIG. 6). With continuing reference to FIG. 6, during a mode of operation corresponding to current region 710 (i.e., when the bidirectional power switch 370 is closed), the conduction losses of the power converter 500 are attributable to the power switch 371 and diode 374 (when the source voltage $V_{ac}$ has positive polarity) and to the power switch 372 and diode 373 (when the source voltage $V_{ac}$ has negative polarity). Similarly, when the bidirectional power switch 370 is open (current region 720), the conduction losses of the power converter are attributable to the diode 330 (when the source voltage $V_{ac}$ has positive polarity) and to the diode 360 (when the source voltage $V_{ac}$ has negative polarity).

Thus, when the mode switch 510 and bidirectional power switch 370 are closed, the conduction losses of the power converter 500 are attributable to one (1) switch and one (1) diode (i.e., 1S+1D). In contrast, the conduction losses of the power converter 100 of FIG. 1 during a similar mode of operation are attributable to one (1) switch and two (2) diodes. Furthermore, when the mode switch is closed and the bidirectional power switch 370 is open, the conduction losses of the power converter 500 are attributable to one (1) diode (i.e., 1D). In contrast, the losses of the power converter 300 of FIG. 3 during a similar mode of operation are attributable to two (2) diodes. Under these circumstances, depending on the type of mode switch 510 employed in the power converter 500, there may also be losses associated with the mode switch 510. Thus, the power converter 500 minimizes the number of circuit components exhibiting conduction losses and decreases the switching losses thereby improving the overall efficiency of the power converter 500.

The use of the capacitors 520, 530 and mode switch 510 in the power converter 500 has a further advantage of alternately charging the output capacitors 520, 530 rather than one output capacitor (as illustrated with respect to the power converter of FIG. 3) at a voltage that is only half the desired output voltage $V_o$ (i.e., when the mode switch 510 is closed). Therefore, the required duty cycle of switch 370 for a particular output voltage $V_o$ is decreased thereby further reducing the conduction losses in the power converter 500. The reduction in duty cycle is illustrated by a relative comparison of time period $D_{500}T_s$ for the current region 710 of the curve 700 for the power converter 500 versus the time period $D_{300}T_s$ for the current region 410 of the curve 400 for the power converter 300 of FIG. 3. The curve 700 is superimposed upon the curve 400 for comparison purposes. Furthermore, because the boost voltage is only half the desired output voltage $V_o$, the switching voltage across the bidirectional power switch 370 and diodes 330, 360 is one-half of the normal voltage, thereby reducing switching losses and possibly electromagnetic interference ("EMI"). A still further advantage resulting when the mode switch 510 is closed is a reduction in a current ripple within the power converter 500. The reduction in the current ripple has several advantages including, without limitation, a further reduction in the conduction losses in the power converter 500 and a reduction in the size of the EMI filter employed in a power supply employing the power converter 500. The reduction in current ripple is illustrated in FIG. 7 by a relative comparison of the curve 700 of the power converter 500 to the curve 400 of the power converter 300. Additionally, while the principles of the present invention have been illustrated in connection with the power converter 500 (i.e., a boost type power converter), the principles are equally applicable to other types of power converters.

Figure 8:
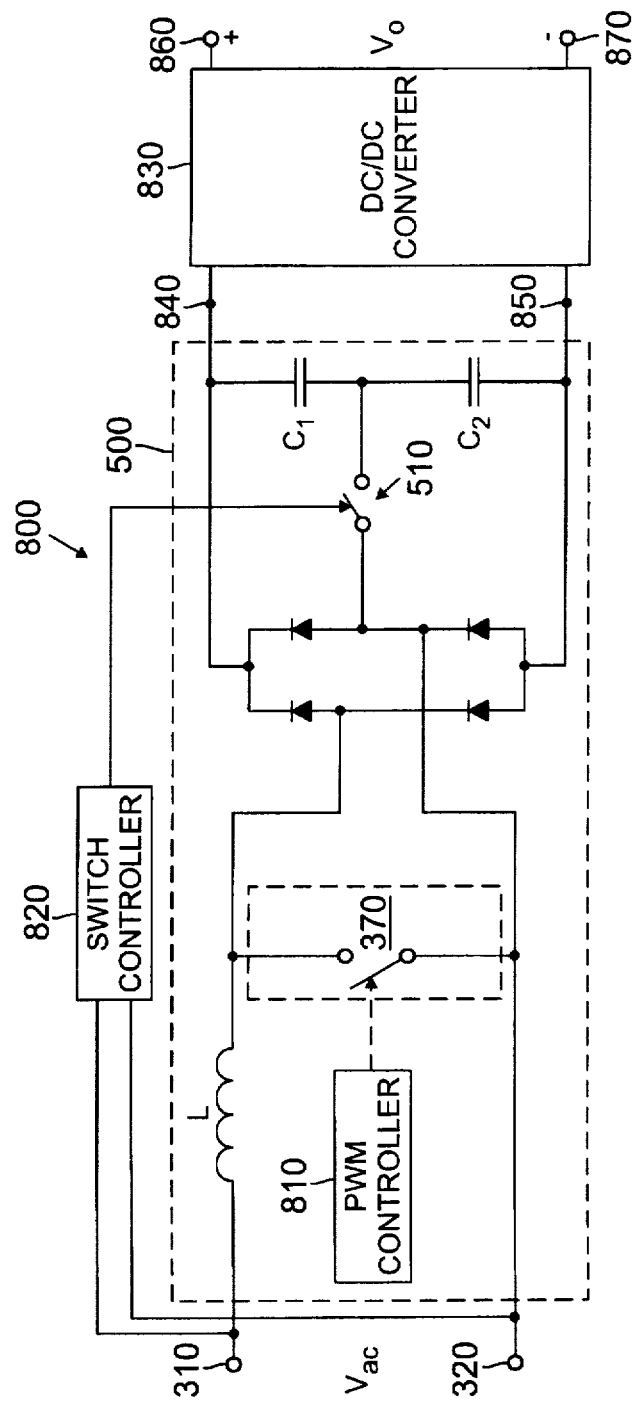
FIG. 8 illustrates a power supply incorporating the power converter of FIG. 5.

Turning now to FIG. 8, illustrated is a power supply 800 incorporating the power converter 500 of FIG. 5. The power supply 800 includes the power converter 500 of FIG. 5 including a PWM controller 810 for selectively closing the bidirectional power switch 370 according to principles known in the art to thereby convert the input voltage $V_{ac}$ to a DC voltage at a pair output terminals 840, 850. The mode switch 510 is controlled by a switch controller 820 to a closed position when the input voltage $V_{ac}$ is below a threshold voltage.

In one embodiment, switch controller 820 and mode switch 510 may be a voltage-controlled relay. In an alternate embodiment, the mode switch 510 is a discrete semiconductor power switching device and the switch controller 820 is a voltage comparator circuit operative to compare a voltage (i.e., an amplitude of the voltage) across the input terminals 310, 320 of the power converter 500 to a reference voltage and, in response thereto, selectively close the switch 510. The voltage sensing circuit in accordance with the principles of the present invention is incorporated into the switch controller 820. While the mode switch 510 and switch controller 820 constitute the mode selection circuit in the illustrated embodiment, other voltage sensing devices in combination with mode switching circuits are well within the broad scope of the present invention.

The power supply 800 further includes a DC/DC converter 830 that operates according to principles well known in the art. The input terminals of the DC/DC converter 830 are coupled to the output terminals 840, 850 of the power converter 500. The DC/DC converter 830 converts the DC output voltage of the power converter 500 to a different DC output voltage $V_o$ available at a pair of output terminals 860, 870 of the power supply 800. The output terminals 860, 870 of the power supply 800 may be coupled to the input terminals of a load (not shown) that requires a DC voltage equal to the DC output voltage of the power supply 800. One of ordinary skill in the art should understand that other power devices (e.g., a DC/AC inverter) may be substituted for the DC/DC converter 830.

Although the present invention has been described in detail, those skilled in the art should understand that they can make various changes, substitutions and alterations herein without departing from the spirit and scope of the invention in its broadest form.

What is claimed is:

1. A power converter having an input couplable to a voltage source and providing a charging current to at least one of first and second serially-coupled output energy storage devices, comprising:

power switching circuitry, coupled to said input, for controlling said charging current conducted through said power converter; and a mode selection circuit, comprising:

a voltage sensing circuit for sensing an input voltage at said input of said power converter; and a mode switching circuit, coupled to said voltage sensing circuit, for selecting an alternative one of:

a first mode wherein said charging current concurrently flows through both of said first and second output energy storage devices when said input voltage exceeds a threshold voltage, and a second mode wherein said charging current alternates flowing through said first and second output energy storage devices when said input voltage is less than said threshold voltage thereby to decrease losses associated with components of said power converter, a duty cycle of said power switching circuitry concurrently reducing to decrease conduction losses associated with said power converter.

2. The circuit as recited in claim 1 wherein both of said first and second output energy storage devices comprise capacitive devices.

3. The circuit as recited in claim 1 comprising a voltage comparator circuit, coupled between said voltage sensing circuit and said mode switching circuit, for comparing said input voltage to said threshold voltage.

4. The circuit as recited in claim 1 wherein said mode switching circuit comprises a relay.

5. The circuit as recited in claim 1 wherein said threshold voltage comprises a voltage slightly less than one-half of a voltage across said first and second output energy storage devices.

6. The circuit as recited in claim 1 wherein said components of said power converter comprise a rectifier coupled between said power switching circuitry and said first and second output energy storage devices.

7. The circuit as recited in claim 1 wherein said power converter comprises an inductor coupled between said input and said power switching circuitry.

8. A method of operating a power converter, having an input couplable to a voltage source and providing a charging current to at least one of first and second serially-coupled output energy storage devices, comprising the steps of:

controlling said charging current conducted through said power converter with power switching circuitry, coupled to said input; and selecting modes of said power converter, comprising the steps of:

sensing an input voltage at said input of said power converter with a voltage sensing circuit; and selecting, with a mode switching circuit, an alternative one of:

a first mode wherein said charging current concurrently flows through both of said first and second output energy storage devices when said input voltage exceeds a threshold voltage, and a second mode wherein said charging current alternates flowing through said first and second output energy storage devices when said input voltage is less than said threshold voltage thereby to decrease losses associated with components of said power converter, a duty cycle of said power switching circuitry concurrently reducing to decrease conduction losses associated with said power converter.

9. The method as recited in claim 8 wherein both of said first and second output energy storage devices comprise capacitive devices.

10. The method as recited in claim 8 wherein the step of selecting comprises the step of comparing said input voltage to said threshold voltage with a voltage comparator circuit coupled between said voltage sensing circuit and said mode switching circuit.

11. The method as recited in claim 8 wherein said mode switching circuit comprises a relay.

12. The method as recited in claim 8 wherein said threshold voltage comprises a voltage slightly less than one-half of a voltage across said first and second output energy storage devices.

13. The method as recited in claim 8 wherein said components of said power converter comprise a rectifier coupled between said power switching circuitry and said first and second output energy storage devices.

14. The method as recited in claim 8 comprising the step of storing energy in an inductor coupled between said input voltage source and said power switching circuitry.

15. A power supply, comprising:

an input couplable to a voltage source; and a power factor correction converter, comprising:

power switching circuitry, coupled to said input, for controlling a charging current conducted through said power supply;

first and second serially-coupled output energy storage devices, coupled to said power-switching circuitry, for receiving said charging current; and a mode selection circuit, coupled between said input and said first and second output energy storage devices, comprising:
- a voltage sensing circuit for sensing an input voltage at said input of said power supply; and
- a mode switching circuit, coupled to said voltage sensing circuit, for selecting an alternative one of:
  - a first mode wherein said charging current concurrently flows through both of said first and second output energy storage devices when said input voltage exceeds a threshold voltage, and
  - a second mode wherein said charging current alternates flowing through said first and second output energy storage devices when said input voltage is less than said threshold voltage thereby to decrease losses associated with components of said power supply, a duty cycle of said power switching circuitry concurrently reducing to decrease conduction losses associated with said power converter.

16. The power supply as recited in claim 15 wherein both of said first and second output energy storage devices comprise capacitive devices.

17. The power supply as recited in claim 15 wherein said power factor correction converter comprises a voltage comparator circuit, coupled between said voltage sensing circuit and said mode switching circuit, for comparing said input voltage to said threshold voltage.

18. The power supply as recited in claim 15 wherein said mode switching circuit comprises a relay.

19. The power supply as recited in claim 15 wherein said threshold voltage comprises a voltage slightly less than one-half of a voltage across said first and second output energy storage devices.

20. The power supply as recited in claim 15 wherein said components of said power supply comprise a rectifier coupled between said power switching circuitry and said first and second output energy storage devices.

21. The power supply as recited in claim 15 wherein said power factor correction converter comprises an inductor coupled between said input and said power switching circuitry.

22. The power supply as recited in claim 15 comprising a DC/DC power converter coupled to said first and second output energy storage devices.

* * * * *